United States Patent [19]

Aoki et al.

[11] Patent Number: 4,687,298
[45] Date of Patent: Aug. 18, 1987

[54] FORMING AN OPAQUE METAL LAYER IN A LIQUID CRYSTAL DISPLAY

[75] Inventors: Shigeo Aoki, Habikino; Yasuhiro Ugai, Yao; Katsumi Miyake, Nara; Kotaro Okamoto, Hino, all of Japan

[73] Assignee: Hosiden Electronics, Ltd., Osaka, Japan

[21] Appl. No.: 812,890
[22] PCT Filed: Apr. 10, 1985
[86] PCT No.: PCT/JP85/00185
 § 371 Date: Dec. 4, 1985
 § 102(e) Date: Dec. 4, 1985
[87] PCT Pub. No.: WO85/04732
 PCT Pub. Date: Oct. 24, 1985

[30] Foreign Application Priority Data

Apr. 11, 1984 [JP] Japan ................ 59-73656

[51] Int. Cl.⁴ ............... H01L 29/78; G02F 1/13
[52] U.S. Cl. ..................... 350/334; 357/23.7
[58] Field of Search ............. 350/334; 357/24, 23.7, 357/30 L, 30 M, 339 R, 339 F

[56] References Cited

U.S. PATENT DOCUMENTS

| 4,172,983 | 10/1979 | McLennan | 357/24 |
| 4,291,326 | 9/1981 | Higuchi et al. | 357/30 L |
| 4,582,395 | 4/1986 | Morozumi | 350/334 |

FOREIGN PATENT DOCUMENTS

| 0027114 | 3/1981 | Japan . | |
| 0030169 | 3/1981 | Japan . | |
| 0025714 | 3/1981 | Japan . | |
| 0065176 | 6/1981 | Japan . | |
| 0107287 | 8/1981 | Japan . | |
| 0050384 | 3/1982 | Japan . | |
| 0107671 | 6/1983 | Japan | 357/30 L |
| 0222546 | 12/1983 | Japan | 357/30 L |
| 0133526 | 7/1984 | Japan | 350/334 |

Primary Examiner—John K. Corbin
Assistant Examiner—David Lewis
Attorney, Agent, or Firm—Pollock, Vande Sande and Priddy

[57] ABSTRACT

A liquid crystal display device is disclosed, which comprises first and second transparent substrates facing each other, a liquid crystal sealed between the transparent substrates, a plurality of display electrodes formed on the inner surface of the first transparent substrate, thin film transistors also formed on the first transparent substrate inner surface and each connected to each display electrode, and a transparent common electrode formed on the inner surface of the second transparent substrate, and in which the thin film transistors are selectively controlled to selectively drive the display electrodes for display. The resistance of semiconductor layers of the thin film transistors is reduced by external light to result in deterioration of the contrast of display. According to the invention, an opaque metal layer is formed between each thin film transistor and the first transparent substrate, and an insulating film is provided between the opaque metal layer and thin film transistor. Source buses of the same material as of and connected to the opaque metal layers are formed on the first transparent substrate.

12 Claims, 14 Drawing Figures

FORMING AN OPAQUE METAL LAYER IN A LIQUID CRYSTAL DISPLAY

FIELD OF THE INVENTION

This invention relates to a liquid crystal display device, which is used for displaying images, for instance, and has a plurality of display electrodes provided in a liquid crystal cell and selectively driven for display by thin film transistors.

PRIOR ART

Figure 1:
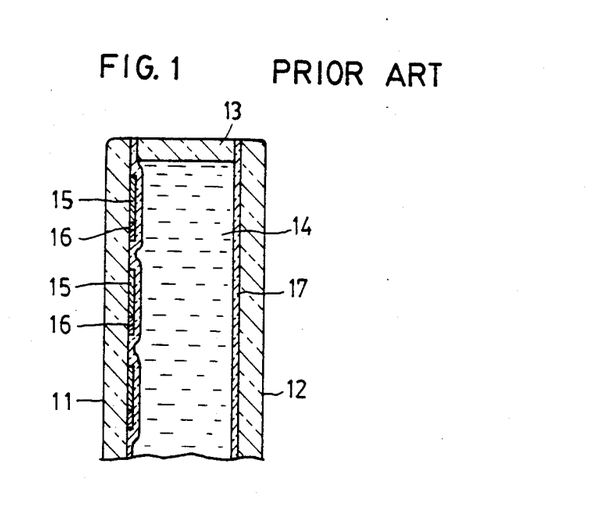
FIG. 1 is a fragmentary schematic sectional view showing a prior art liquid crystal display device.

FIG. 1 shows a prior art liquid crystal display device structure of the conventional type. The device comprises a pair of glass or like transparent substrates 11 and 12 facing each other and spaced apart by a spacer 13 provided therebetween along the edges. Liquid crystal 14 is sealed between substrates 11 and 12. Substrates 11 and 12, spacer 13 and liquid crystal 14 constitute a liquid crystal cell. Formed on the inner surface of substrate 11, for instance, are a plurality of display electrodes 15 constituted by a transparent conductive film. Thin film transistors 16 are formed contiguous to display electrodes 15 with their drains connected thereto and serve as switching elements. Common, electrode 17 is formed on the entire inner surface of the other transparent substrate 12 and faces display electrodes 15.

Figure 2:
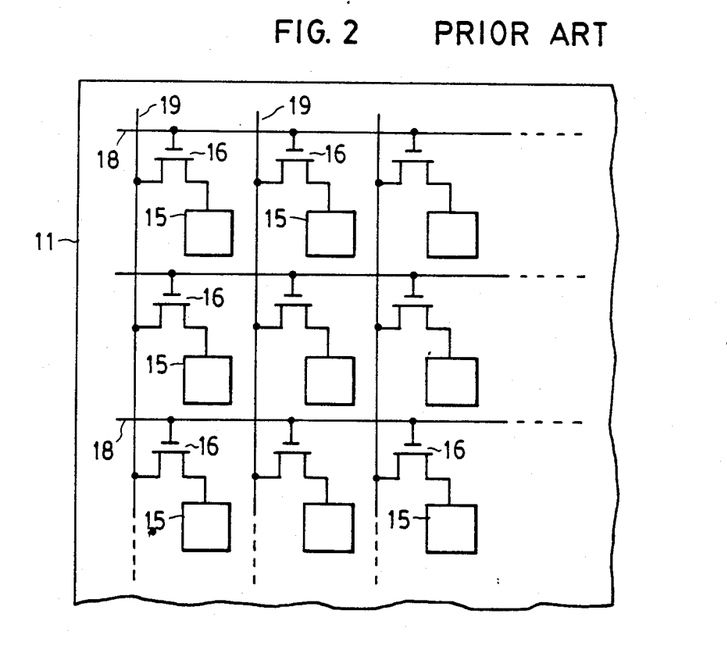
FIG. 2 is a view showing an equivalent electric circuit of a prior art liquid crystal display device of matrix type.

Display electrodes 15 may serve as picture element electrodes. They are square in shape and are arranged in a closely spaced-apart relation to one another, as shown in FIG. 2. More specifically, they are arranged in rows and columns on transparent substrate 11. Gate buses 18 are formed near and along the individual rows of display electrodes 15. Source buses 19 are formed near and along the individual columns of display electrodes 15. Thin film transistors 16 noted above are formed at the intersections of gate and source buses 18 and 19. More specifically, each thin film transistor 16 is formed with its gate connected to associated gate bus 18, its source connected to associated source bus 19 and its drain connected to corresponding display electrode 15.

In operation, a voltage is applied between a selected one of gate buses 18 and a selected one of source buses 19. Corresponding thin film transistor 16 is turned on as a result, whereby charge is stored on display electrode 15 connected to the drain of this "on" thin film transistor 16. A voltage is applied across a portion of liquid crystal 14 that is found between this display electrode and common electrode 17. This display electrode alone, is thus rendered transparent or opaque. Only selected display electrodes are rendered transparent or opaque in this way, whereby a corresponding display image is formed. Usually, a polarizer (not shown) is incorporated to render selected display electrodes transparent or opaque.

Figure 3:
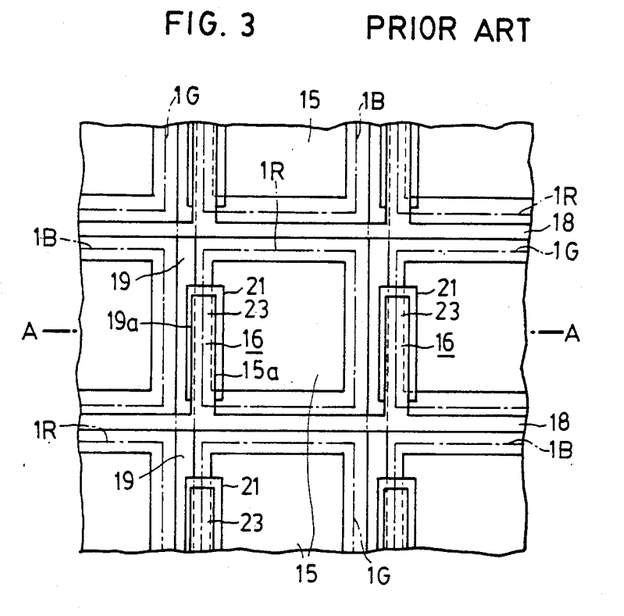
FIG. 3 is a fragmentary plan view showing an arrangement of display electrodes and thin film transistors of a prior art matrix type liquid crystal display device.
Figure 4:
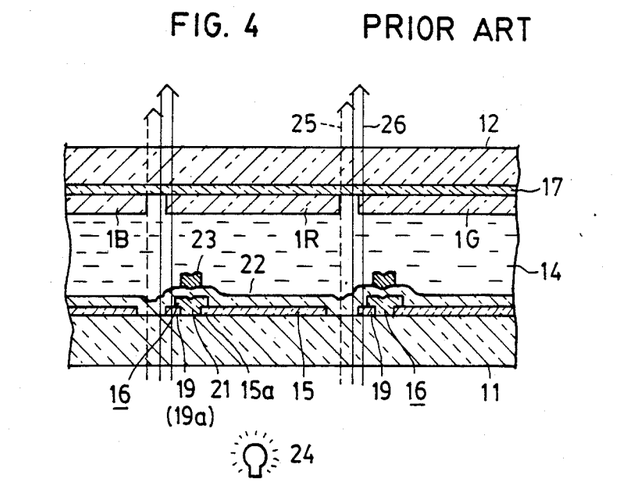
FIG. 4 is a sectional view taken along line A—A in FIG. 3.

Thin film transistor 16 usually has a structure as shown in FIGS. 3 and 4. Referring to the Figures, display electrodes 15 and source buses 19 are formed from a transparent conductive film, e.g., an ITO film, which is formed on transparent substrate 11. Semiconductor layers 21 of amorphous silicon or the like are formed such that each of them strides portions of corresponding display electrode 15 and source bus 19 which extend parallel to and are closely spaced apart from each other. Gate insulating film 22 of silicon nitride or the like is formed on semiconductor layers 21. Gate electrodes 23 are formed on gate insulating film 22 such that they overlie portions of display electrodes 15 and source buses 19 via the semiconductor layers 21. The gate electrodes 23 are each connected at one ends to the corresponding gate buses 18. Portions of the display electrodes 15 and source bus 19 facing each gate electrode 23 serve as drain and source electrodes 15a and 19a, respectively. Each thin film transistor 16 is constituted by corresponding electrodes 15a and 19a, semiconductor layer 21, gate insulating film 22 and gate electrode 23. Gate electrodes 23 and gate buses 18 are formed at a time from aluminum, for instance.

This example of liquid crystal device is used for color display and has red, green and blue filters 1R, 1G and 1B provided on the side of transparent substrate 12. Filters 1R, 1G and 1B each face a corresponding display electrode 15. These color filters are distributed substantially uniformly as shown in FIG. 3.

Light source 24 is provided behind transparent substrate 11, as shown in FIG. 4. More specifically, light from light source 24 or any other external light is transmitted through the liquid crystal display device according to the controlled state of the liquid crystal cell. The display state of the device can be seen from the side of transparent substrate 12.

Semiconductor layer 21, particularly amorphous silicon, has photo-conductivity. Semiconductor layer 21 is receiving light from light source 24 and/or external light at all time. Therefore, the "off" current in each thin film transistor 16, i.e., current present in thin film transistor 16 when it is "off", can not be made sufficiently small, that is, the "on"-to-"off" current ratio of each thin film transistor 16 can not be made sufficiently large. That is undesired from the standpoint of sufficient contrast, particularly when thin film transistors 16 are driven in a high duty cycle operation.

The liquid crystal display device further comprises a polarizer (not shown), which is provided on either side surface of the liquid crystal cell. The device may be either of a normally black type or so-called negative type where no light is transmitted unless a voltage is applied between common electrode 17 and any display electrode 15 or of a normally white type or so-called positive type where light is transmitted in the absence of voltage applied between common electrode 17 and display electrode 15.

In the prior art liquid crystal display device, light 25, 26 (FIG. 4) transmitted through portions of the device other than the portions occupied by the display electrodes reduces the display contrast and color purity, thus deteriorating the image quality. Particularly, in the device of the normally white type the same light as that which is transmitted through a display electrode 15 of a 100% white level is transmitted through portions between adjacent color filters and has a great adverse effect on the image quality.

An object of the invention is to provide a liquid crystal display device, in which thin film transistors have a high "on"-to-"off" current ratio and a sufficient contrast can be obtained even if the thin film transistors are driven at a high duty ratio, and which can be manufactured comparatively easily, as well as a method of manufacturing the same liquid crystal display device.

Another object of the invention is to provide a liquid crystal display device, in which thin film transistors can be driven with a high duty ratio, and which permits to obtain a satisfactory image quality having high contrast and color purity, as well as a method of manufacturing the same liquid crystal display device.

SUMMARY OF THE INVENTION

In the liquid crystal display device according to the invention, in which a plurality of display electrodes and thin film transistors connected thereto are formed on the inner surface of one of a pair of transparent substrates, an opaque metal layer is formed between each thin film transistor and the associated transparent substrate, and also source buses of the same material as of and connected to these opaque metal layers are formed on the same transparent substrate. That is, the opaque metal layers and source buses are formed simultaneously. Further, an insulating layer is provided between each opaque metal layer and corresponding thin film transistor, and the source electrode thereof is connected to the corresponding opaque metal layer through the insulating layer. If necessary, second source buses connected to the source electrodes may be formed together with these source electrodes, that is, each source bus may have a double-layer structure consisting of the opaque metal layer and the layer of the same material as of the source electrode.

The opaque metal layer thus formed prevents light necessary for the display from reaching the semiconductor layer of the thin film transistor. A sufficiently high resistance of the semiconductor layer thus can be provided while the thin film transistor is "off". A display having excellent contrast thus can be obtained even if the thin film transistors are driven with a high duty ratio. Besides, the opaque metal layers can be formed together with the source buses, and hence comparatively easily.

Further, metal light-blocking layers are formed on areas of the inner surface of the transparent substrate, which face the transparent substrate with the display electrodes formed thereon, the areas corresponding to the gaps between adjacent display electrodes. In the case of a color liquid crystal display device, the light-blocking layers are formed between adjacent color filters. The common electrode is preferably formed on these light-blocking layers. Where this arrangement is applied to particularly a liquid crystal display device of normally white type, light is blocked at all time by portions of the device where light on-off control is not performed according to display information. It is thus possible to obtain a satisfactory image quality having high contrast and color purity.

DESCRIPTION OF THE PREFERRED EMBODIMENTS

The main part of the liquid crystal display device and method of manufacturing the same according to the invention resides in the thin film transistors. Therefore, the invention will now be described in conjunction with an example of the method of forming display electrodes and thin film transistors with reference to FIGS. 5A to 5I.

Figure 5A:
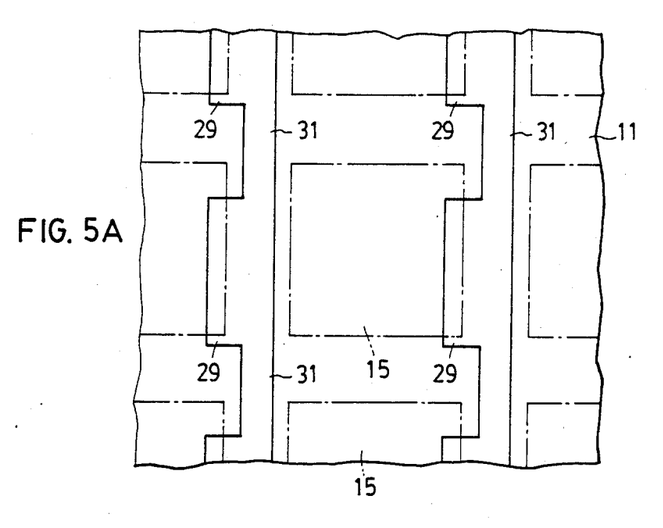
FIGS. 5A to 5I illustrate an example of the process for formation of display electrodes and thin film transistors in an embodiment of the invention, with FIGS. 5A and 5H being fragmentary plan views and FIGS. 5B to 5G and 5I being sectional views.
Figure 5B:
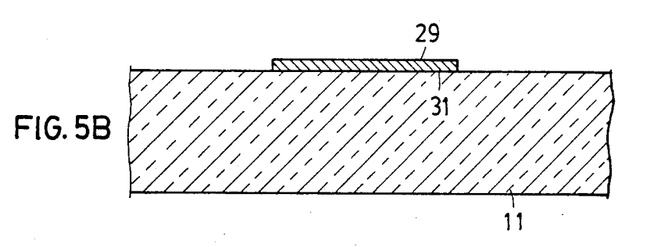

As transparent substrate 11 of the liquid crystal display device, as shown in FIG. 5A, is used a glass substrate, for instance. Opaque metal layers 29 are formed on areas of substrate 11 where thin film transistors 16 are to be formed. At this time, source buses 31 of the same material as opaque metal layers 19 are formed. For instance, opaque metal layers 29 and source buses 31 are formed by depositing chromium to a thickness of 1,000 to 2,000 angstroms on the entire surface of transparent substrate 11 and then photo-etching the deposited chromium layer. As is seen from FIG. 5A, source buses 31 are formed such that they extent along and near the individual columns of square display electrodes 15. Opaque metal layers 29 are actually extensions of the source buses 31 on one side thereof. In FIG. 5A, the areas occupied by display electrodes 15 are shown by phantom line rectangles.

Figure 5C:
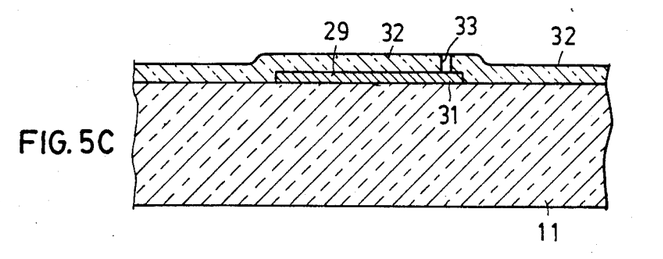

Subsequently, an insulating layer 32 is formed to cover the entire surface of transparent substrate 11 inclusive of the opaque metal layers 29 and source buses 31, as shown in FIG. 5C. The insulating layer 32 is then formed with holes 33 which correspond in position to source electrodes 19a of thin film transistors 16. The insulating film 32 desirably is transparent and has a low dielectric constant. For instance, it is of $SiO_2$, and has a thickness of 5,000 angstroms to 1 micron.

Figure 5D:
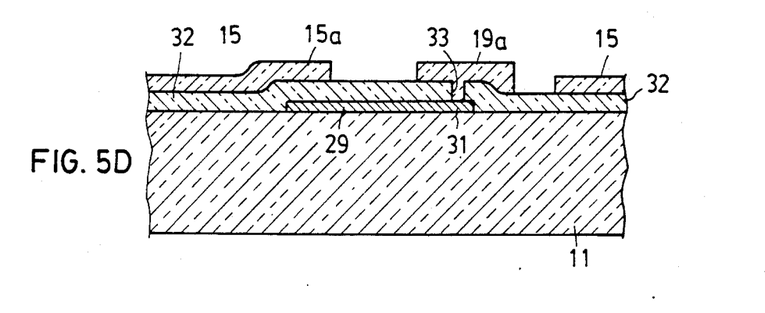

Then, drain and source electrodes 15a and 19a facing each opaque metal layer 29 are formed, as shown in FIG. 5D. Drains 15a are constituted by part of display electrodes 15. These electrodes 15 and 19a are transparent; for instance, they may be of ITO and formed to a thickness of 500 angstroms or below. At this time, the source electrodes 19a are connected to source buses 31 through the holes 33, and thus electrically connected to the opaque metal layers 29. If necessary, second source buses 19 connected to the source electrodes 19a are formed at the same time. The electrodes 15a and 19a and the second source buses 19 are formed at a time by depositing a transparent metal film and photo-etching the deposited film, the process being well known in the art. The second source buses 19 have the same disposition and shape as those in the arrangement shown in FIG. 3. Further, each second source bus 19 of a transparent metal and corresponding source bus 31 of an opaque metal are connected to each other by placing directly one upon the other at one ends thereof at a source terminal 34, as shown in FIGS. 5H and 5I. Likewise, these buses are connected together at the other ends.

Figure 5E:
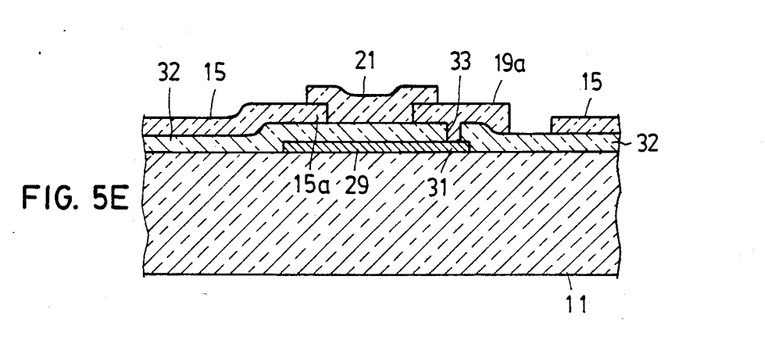

Semiconductor layer 21, e.g., of amorphous silicon, is then formed on the insulating film 32 such that it extends between and partly overlies the drain electrode 15a (as part of display electrode 15) and the source electrode 19a, as shown in FIG. 5E. The semiconductor layer 21 entirely faces the opaque metal layer 29 or the source bus 31 via the insulating layer 32. Its thickness is 0.5 micron or below.

Figure 5F:
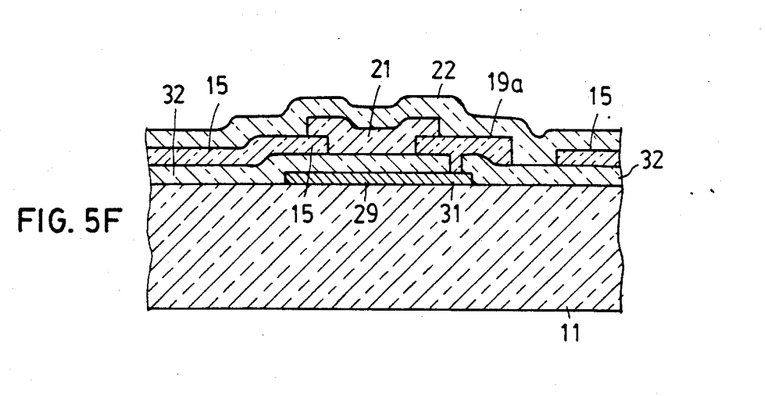
Figure 5G:
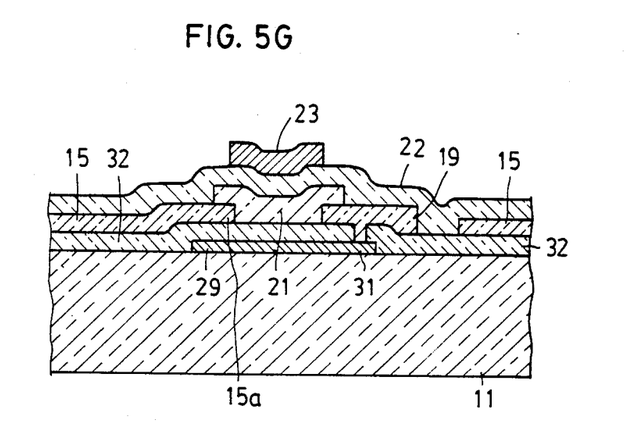
Figure 5H:
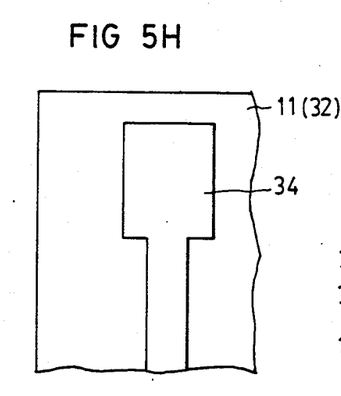
Figure 5I:
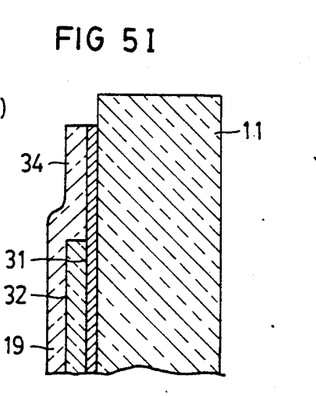

Gate insulating film 22 is then formed to cover the semiconductor layer 21 entirely, as shown in FIG. 5F. The gate insulating film 22 may be a SiN$_x$ film with a thickness of 0.5 micron or below. Then, the gate electrode 23 facing the semiconductor layer 21 via the gate insulating film 22 is formed, as shown in FIG. 5G. The gate electrode 23 may be formed from an aluminum film with a thickness of 5,000 angstroms to 1 micron. In the above way, the display electrodes 15 and the thin film transistors 16 are formed.

Figure 6:
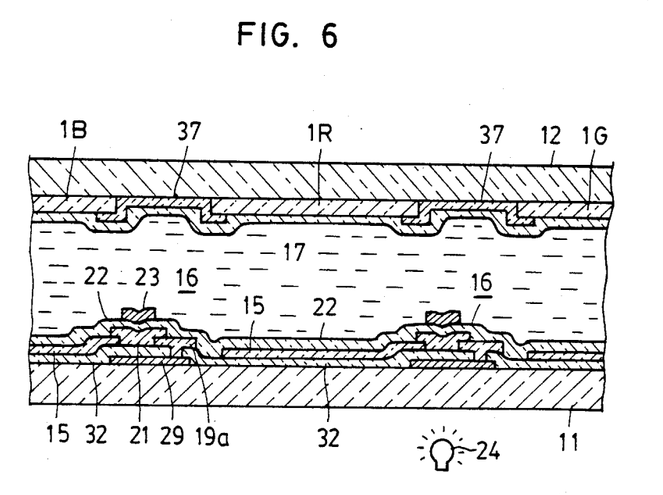
FIG. 6 is a fragmentary sectional view showing an embodiment of the liquid crystal display device according to the invention.

FIG. 6 partly shows an example of liquid crystal display device of color display type, which is produced using transparent substrate with display electrodes 15 and thin film transistors 11 noted above. In the Figure, parts like those in FIGS. 3, 4 and 5A to 5G are designated by like reference numerals and symbols. This example is one in which color filters 1R, 1G and 1B corresponding to the display electrodes 15 are formed on the transparent substrate 12, and the metal light-blocking layers 37 are formed to close the gaps between adjacent color filters. The light-blocking layers 37 may be made of aluminum, chromium, etc. and have a thickness of 2,000 to 3,000 angstroms, which may be formed by means of deposition or spattering. The device of FIG. 6 is formed by first forming the color filters 1R, 1G and 1B on the transparent substrate 12, then forming the light-blocking layers 37 to close the gaps between adjacent color filters, and then forming the common electrode 17 to cover the entire surfaces of color filters and light-blocking layers 37. However, it is also possible to first form light-blocking layers 37 and then form the color filters. As a further alternative, it is possible to first form the common electrode 17.

The description so far has been concerned with the color liquid crystal device. However, the invention is also applicable to liquid crystal display devices of monochromic display type and also to liquid crystal display devices of light reflection type. Further, the invention is applicable to various other kinds of liquid crystal display devices. For example, bar-like segment display electrodes arranged in the form of a figure eight may be selectively driven for the display of numerals.

As has been shown in the foregoing, with the liquid crystal display device according to the invention light from the light source 24 for display or any other external light is blocked by the layer 29 and never reaches semiconductor layer 21. Thus, it is possible to ensure a sufficiently high "off" resistance of each thin film transistor 16 and hence a sufficiently high "on"-to-"off" current ratio thereof. Satisfactory contrast thus can be obtained even when thin film transistors 16 are driven with a high duty ratio. Further, since opaque metal layers 29 are formed along with source buses 31, it can be formed comparatively easily and without particularly complicating the structure.

An intent to increase the density of display electrodes 15 will lead to a sacrifice in the width of source buses 31 and increase the possibility of occasional disconnection of the buses. The formation of second source buses 19 will alleviate this difficulty. That is, the second source buses 19 provide for a double-layer structure of the source buses to improve reliability and increase yield even with a high-density large-area liquid crystal display device.

In a still further aspect, with the prior art liquid crystal display device shown in FIGS. 3 and 4, light from light source 24 is transmitted through a selected source bus 19, between which and common electrode 17 a voltage is applied, thus deteriorating the contrast of display. Particularly, in the case of the color display the display color becomes lighter. With the liquid crystal display device according to the invention, the source buses 31 formed together with the opaque metal layers 29 are opaque. Therefore, light is never transmitted through any selected source bus 31. The contrast thus is improved, and also there is no possibility for the display color to become lighter.

Furthermore, with the provision of light-blocking layers 37 to close the gaps between adjacent color filters, there is no possibility of transmission of undesired light through the gaps between adjacent color filters. This promotes the improvement of the contrast and color purity, and hence the image quality. Further, the formation of color filters 1R, 1G and 1B produces surface level differences along the edges of the filters. These stepped filter edges are liable to cause separation of a portion of common electrode 17 overlying a color filter. Even if this results, light-blocking layers 37 may ensure electric connection of such a portion on a color filter to the common electrode 17. To this end, the structure of FIG. 6 is suited. In addition, with the common electrode 17 formed on the previously formed color filters, voltage application across part of liquid crystal 14 between the common electrode 17 and any display electrode 15 may be achieved more efficiently than in the case of the prior art structure shown in FIG. 4.

It may be thought to form the light-blocking layers 37 as a black filter. The black filter, however, must be formed as a lamination of a red filter, a green filter and a blue filter. Therefore, the mask alignment involved is cumbersome. In addition, a considerable thickness is necessary to be able to block light sufficiently. This means that the formation of the black filter requires a great deal of attention. In contrast, the metal light-blocking layers 37 ma be formed easily.

What is claimed is:

1. A liquid crystal display device comprising first and second transparent substrates closely spaced apart and facing each other, a liquid crystal sealed between said transparent substrates, a plurality of transparent display electrodes provided on the inner surface of said first transparent substrate, thin film transistors formed on said first transparent substrates and each having a drain connected to each said display electrode, and a transparent common electrode formed substantially on the entire inner surface of said second transparent substrate, said thin film transistors each including a semiconductor layer formed between corresponding display electrode and source electrode, a gate insulating film formed on said semiconductor layer on the side opposite said first transparent substrate, and a gate electrode formed on said gate insulating film, an opaque metal layer being formed between each said thin film transistor and said first transparent substrate with an insulating layer provided between the thin film transistor and the opaque metal layer, source buses of the same material as said opaque metal layer being formed integrally therewith on the side of said first transparent substrate to face said source electrodes thru said insulating layer, said source buses being connected to said source electrodes through holes formed in said insulating layer.

2. The liquid crystal display device according to claim 1, wherein second source buses of the same opaque metal as of said source electrodes are formed on the side of said insulating layer opposite said first transparent substrate and connected to said source electrodes, and each said second source bus and the corresponding source bus of said opaque metal layers are connected together at a source terminal.

3. The liquid crystal display device according to claim 1 or 2, wherein light-blocking layers of an opaque metal are formed on portions of said second transparent substrate corresponding to gaps between adjacent display electrodes.

4. The liquid crystal display device according to claim 3, wherein color filters are formed on said second transparent substrate such that they face said display electrodes.

5. The liquid crystal display device according to claim 4, wherein said light-blocking layers are formed between said common electrode and said second transparent substrate.

6. The liquid crystal display device according to claim 5, wherein said light-blocking layers partly overlie said color filters on the side opposite said second transparent substrate.

7. The liquid crystal display device according to claim 4, wherein said display electrodes are picture element electrodes arranged in a matrix array, said thin film transistors connected to the picture element electrodes in each column have their source electrodes connected to a common source bus, said thin film transistors connected to the picture element electrodes in each row of said matrix array have their gate electrodes connected to a common gate bus, and said color filters consist of a plurality of different color filters, which are substantially uniformly distributed.

8. The liquid crystal display device according to claim 1 or 2, wherein said display electrodes are picture element electrodes arranged in a matrix array, said thin film transistors connected to the picture element electrodes in each column have their source electrodes connected to a common source bus, and said thin film transistors connected to the picture element electrodes in each row of said matrix array have their gate electrodes connected to a common gate bus.

9. A method of manufacturing a liquid crystal display device by the steps of forming a plurality of transparent display electrodes and thin film transistors with their drains connected to said transparent display electrodes on one surface of a first transparent substrate, forming a transparent common electrode on and substantially over the entire surface of a second transparent substrate and sealing a liquid crystal between said first and second transparent substrates with said display electrodes and common electrode on the inner side, wherein:

opaque metal layers are formed on areas of one surface of said first transparent substrate where said thin film transistors are to be formed, together with source buses of the same material as and connected to said opaque metal layers;

an insulating layer is formed on said opaque metal layers and source buses;

holes are formed in said insulating layer at positions corresponding to said source buses prior to the formation of said thin film transistors on said opaque metal layers, the source electrodes of said thin film transistors being connected to said source buses through said holes.

10. The method of manufacturing a liquid crystal display device according to claim 9, wherein the source electrodes of said thin film transistors, said display electrodes and second source buses connected to said source electrodes are formed at a time from the same transparent metal in the formation of said thin film transistors, and at least one end of each said second source bus is connected to a corresponding end of the corresponding source bus of said opaque metal in an overlying relation thereto at a source terminal.

11. The method of manufacturing a liquid crystal display device according to claim 9 or 10, wherein said common electrode is formed after formation of color filters on portions of said second transparent substrate facing said display electrodes and metal light-blocking layers filling gaps between adjacent color filters.

12. The method of manufacturing a liquid crystal display device according to claim 11, wherein said light-blocking layers are formed after formation of said color filters.

* * * * *